No. 761,902. PATENTED JUNE 7, 1904.
E. S. PIPER.
TRAIN ORDER SIGNAL.
APPLICATION FILED MAR. 29, 1904.
NO MODEL.

Witnesses
P. R. Jones.
A. M. McRae.

Inventor
Edward S. Piper.
by Ridout & Maybee
attys

No. 761,902. Patented June 7, 1904.

UNITED STATES PATENT OFFICE.

EDWARD S. PIPER, OF TORONTO, CANADA.

TRAIN-ORDER SIGNAL.

SPECIFICATION forming part of Letters Patent No. 761,902, dated June 7, 1904.

Application filed March 29, 1904. Serial No. 200,644. (No model.)

*To all whom it may concern:*

Be it known that I, EDWARD S. PIPER, of the city of Toronto, Province of Ontario, Canada, have invented certain new and useful Improvements in Train-Order Signals, of which the following is a specification.

My invention relates to train-order signals of the type shown and described in United States Patent No. 698,317, dated April 22, 1902, in which back lights corresponding to the main light shown at the other side of the target are exhibited from lateral tubes; and the objects of my invention are to construct the apparatus so that a removable lamp may be employed without exposing the inner ends of the lateral tubes to the weather, so that a sufficient quantity of light is sent to the back lights to compensate for extra losses by reflection and absorption due to the mirrors and protecting-glasses of the back lights, and so that the main and back lights may be separated, if desired, by a greater distance than in the construction shown in the above-named patent.

With these objects in view my invention consists of the details of construction hereinafter more specifically described and then definitely claimed.

Figure 1:
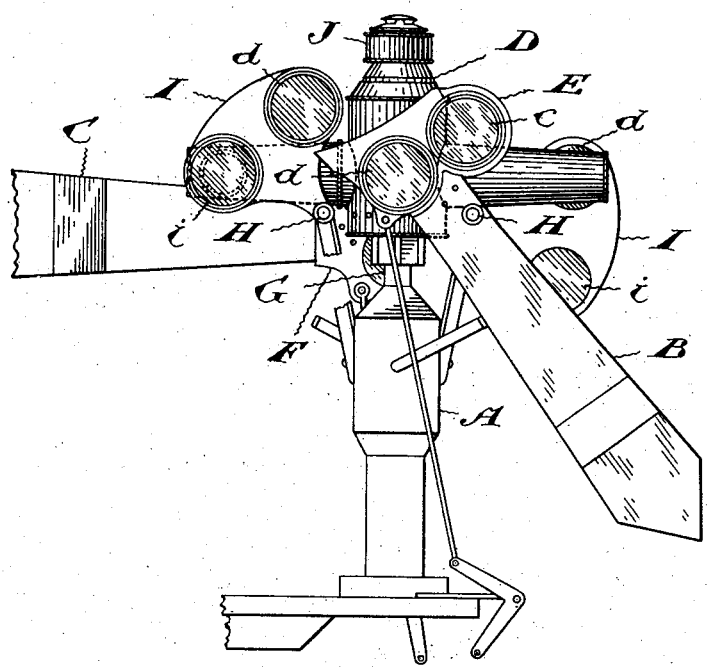
Figure 2:
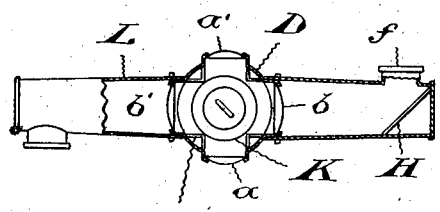
Figure 3:
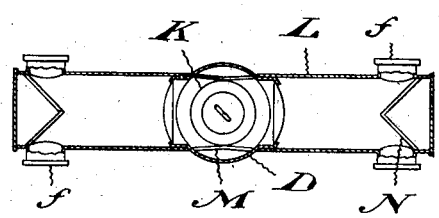
Figure 4:
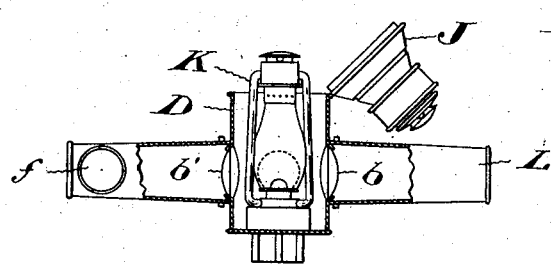

Figure 1 is a front elevation of my improved train-order signal. Fig. 2 is a horizontal sectional view of the illuminating portion of the apparatus. Fig. 3 is a similar view of a modification of the same. Fig. 4 is a vertical section of the illuminating portion of the apparatus.

In the drawings like letters of reference indicate corresponding parts in the different figures.

In Fig. 1, A is the post or standard supporting the apparatus, which will be suitably supported at the point at which train-orders are to be given. Upon the post or standard are pivoted the targets B and C. These targets are provided, respectively, with spectacles E and F, suitably connected to the targets. Such spectacles are now commonly used and are generally provided with one red and one green glass. In the drawings red glasses in the spectacles are lettered $c$ and green glasses $d$. The pivot of each signal-arm is formed by a spindle H, suitably journaled on the frame of the apparatus. On the opposite end of each spindle from the signal-arm is secured a supplemental spectacle I, provided, like the main spectacle, with glasses of different colors, preferably with a green glass $d$ and a white ground glass $i$. These parts are well known, and the light for the main and back spectacles has heretofore been provided by a semaphore-lamp provided with four lenses, those in the back and front illuminating the main spectacles and those at the sides throwing their light into stationary tubes adapted and arranged to reflect the light through the back spectacles. As set out in the preamble of this specification, this construction possesses many defects, and I have substituted, therefore, the construction which I am about to describe. D represents a casing provided with a bottom socket fitting over the plug G of the post A. The top of this casing is closed by a hinged cover J, and both the casing and cover are provided with suitable apertures to provide a draft for the lamp K, which is placed within the casing, but is removable therefrom. This lamp is preferably, as shown, an ordinary tubular lantern, which may be lighted in a sheltered place, carried to the order-signal, and placed within the casing D. In the back and front of the casing are formed suitable apertures provided with the lenses $a'$ $a'$. In the sides of the casing are formed larger apertures provided with the larger lenses $b$ $b'$. Laterally-extending tapered tubes L are secured to the casing, with their larger ends about the side apertures $b$ $b'$ therein. These tubes are preferably polished inside and have glazed apertures $f$ formed therein, one in each tube, suitably situated to illuminate the back spectacles. Within each tube is located an inclined reflector H, adapted to direct the rays from the side lenses $b$ $b'$ out through the glazed apertures. Within the casing D between the apertures I place V-shaped vertical reflectors M, which serve to deflect light striking them into the lenses.

In Fig. 3 I show a modification of the invention. In some cases it is desirable to have the main light and the back light more widely separated than they are with the construction shown in Figs. 1 and 2. To obtain this result, I leave out the lenses $a\,a'$ and make the side lenses $b\,b'$ of greater size than ordinary. The tubes L are made correspondingly larger, and glazed apertures are provided in each side of each tube at or near its end. V-shaped reflectors N are provided between these apertures, adapted to divide the light from the lenses and throw it outwardly through the glazed apertures. I employ V-shaped reflectors M within the casing, as before; but as the apertures are only two in number only two reflectors are employed. By this arrangement I double the distance by which the main and supplemental lights are separated, and thus avoid all possibility of the lights blending with one another as seen from a distance.

The advantages of my improvements will be obvious. No difficulty can be caused by snow and ice collecting between the lamp and the tube ends, as was possible in the construction shown in the prior patent referred to. As the lenses are all carried by the casing D, an ordinary light tubular lantern may be employed for illuminating purposes. It was also found that there was frequently a deficiency of light for the back signals, owing to the number of surfaces of glass through which the light had to pass and from which it could be partially reflected. I have obviated this difficulty by reducing the number of glasses through which the light must pass and by increasing the size of the side lenses and tapering the lateral tubes. The light of the lamp is also utilized to greater advantage by the employment of the vertical V-shaped reflectors, to which I have already referred. Another advantage of the use of the separate lantern is that the lenses do not become smoked up and then have the dirt baked on them by neglect, as often occurred with the old arrangement. The lantern being removed every day, is readily cleaned in the lamp-room. As the lantern is inclosed in a casing which normally remains in position, it is at all times easily removed and never becomes frozen in its place.

What I claim as my invention is—

1. In a back-light train-order signal the combination of a closed casing adapted to receive a removable lamp, the casing having apertures formed therein at the back, front and sides, each provided with a suitable lens; laterally-extending tubes secured to the casing about the side apertures, each tube having a glazed aperture in one of its sides; and inclined reflectors located in the said tubes, one behind each aperture, substantially as described.

2. In a back-light train-order signal the combinaton of a closed casing adapted to receive a removable lamp, the casing having apertures formed therein at the back and front, and a larger aperture at each side, each provided with a suitable lens; laterally-extending tapered tubes secured to the casing about the side apertures and by their larger ends, each tube having a glazed aperture in one of its sides; and inclined mirrors located in the said tubes, one behind each aperture, substantially as described.

3. In a back-light train-order signal the combination of a closed casing adapted to receive a removable lamp, the casing having apertures formed therein at the back, front and sides, each provided with a suitable lens; V-shaped vertical reflectors fitted in the casing between the apertures; laterally-extending tubes secured to the casing about the side apertures, each tube having a glazed aperture in one of its sides; and inclined reflectors located in the said tubes, one behind each aperture, substantially as described.

4. In a back-light train-order signal the combination of a closed casing adapted to receive a removable lamp, the casing having apertures formed therein at the back and front, and a larger aperture at each side, each provided with a suitable lens; V-shaped vertical reflectors fitted in the casing between the apertures; laterally-extending tapered tubes secured to the casing about the side apertures and by their larger ends, each tube having a glazed aperture in one of its sides; and inclined mirrors located in the said tubes, one behind each aperture, substantially as described.

5. In a back-light train-order signal the combination of a closed casing adapted to receive a removable lamp, the casing having apertures in its sides, each provided with a suitable lens; laterally-extending tubes secured to the casing about the apertures, each tube having opposed apertures in its sides; and V-shaped reflectors fitted in each tube between the opposed apertures, substantially as described.

6. In a back-light train-order signal the combination of a closed casing adapted to receive a removable lamp, the casing having apertures in its sides, each provided with a suitable lens; V-shaped vertical reflectors fitted in the casing between the apertures; laterally-extending tubes secured to the casing about the apertures, each tube having opposed apertures in its sides; and V-shaped reflectors fitted in each tube between the opposed apertures, substantially as described.

Toronto, March 18, 1904.

EDWD. S. PIPER.

In presence of—
 JOHN G. RIDOUT,
 P. R. JONES.